United States Patent
Igakura (10) Patent No.: US 8,856,139 B2
(45) Date of Patent: Oct. 7, 2014

(54) FILE MANAGING SYSTEM

(75) Inventor: Tomohiro Igakura, Tokyo (JP)

(73) Assignee: NEC Corporation, Tokyo (JP)

( * ) Notice: Subject to any disclaimer, the term of this patent is extended or adjusted under 35 U.S.C. 154(b) by 1386 days.

(21) Appl. No.: 09/960,548

(22) Filed: Sep. 20, 2001

(65) Prior Publication Data

US 2002/0042796 A1 Apr. 11, 2002

(30) Foreign Application Priority Data

Sep. 21, 2000 (JP) ................................. 2000-287523

(51) Int. Cl.
 *G06F 7/00* (2006.01)
 *G06F 17/00* (2006.01)
 *G06F 17/30* (2006.01)
(52) U.S. Cl.
 CPC ................ *G06F 17/30067* (2013.01)
 USPC .......................... 707/747; 707/705; 707/699
(58) Field of Classification Search
 USPC ............... 714/2; 709/203; 712/236; 719/328; 707/640, 698; 715/205
 See application file for complete search history.

(56) References Cited

U.S. PATENT DOCUMENTS

| | | | | |
|---|---|---|---|---|
| 5,109,511 A | * | 4/1992 | Nitta et al. ..................... | 718/104 |
| 5,440,723 A | * | 8/1995 | Arnold et al. ................... | 714/2 |
| 5,732,265 A | * | 3/1998 | Dewitt et al. .................... | 1/1 |
| 5,734,886 A | * | 3/1998 | Grosse et al. ................... | 1/1 |
| 5,978,791 A | * | 11/1999 | Farber et al. ................... | 707/640 |
| 6,144,969 A | * | 11/2000 | Inokuchi et al. ............... | 707/200 |
| 6,199,082 B1 | * | 3/2001 | Ferrel et al. .................... | 715/205 |
| 6,338,082 B1 | * | 1/2002 | Schneider ...................... | 709/203 |
| 6,353,820 B1 | * | 3/2002 | Edwards et al. ............... | 707/696 |
| 6,381,691 B1 | * | 4/2002 | Altman et al. .................. | 712/236 |
| 6,415,280 B1 | * | 7/2002 | Farber et al. ................... | 707/698 |
| 6,546,405 B2 | * | 4/2003 | Gupta et al. .................... | 715/512 |
| 6,560,631 B1 | * | 5/2003 | Ishihara et al. ................ | 709/201 |
| 7,117,504 B2 | * | 10/2006 | Smith et al. .................... | 719/328 |

FOREIGN PATENT DOCUMENTS

| | | |
|---|---|---|
| JP | 4-360246 A | 12/1992 |
| JP | 6-266593 | 9/1994 |
| JP | 8-339321 | 12/1996 |

* cited by examiner

*Primary Examiner* — Susan Chen
(74) *Attorney, Agent, or Firm* — Dickstein Shapiro LLP (57) ABSTRACT

A correspondence table 0121 for recording the correspondence relationship of file titles, file IDs and managing IDs, hash tables 0122 for recording the correspondence relationships of hash values of files and managing IDs and a file memory 0123 for keeping managing IDs and files are provided. When registering files, a file with any registered same title file is managed as a separate file by giving a separate managing ID. File content comparison with registered files is done, and a file with any registered same content file is registered as single file even if it has been registered with a separate file ID. When calling out a file, the file to be called is specified by the combination of the file title and the file ID.

8 Claims, 10 Drawing Sheets

| FILE NAME | FILE ID | MANAGING ID |
|---|---|---|
| file A | usr 001. prog 01 | A-1 |
| | usr 001. prog 02 | A-2 |
| | usr 002. prog 01 | A-1 |
| file B | usr 002. prog 01 | B-1 |
| | usr 003. prog 01 | B-2 |
| ⋮ | ⋮ | ⋮ |

FIG.4

| FILE NAME | FILE | | MANAGING ID |
|---|---|---|---|
| file A | FuncA ( ) | 0401 | A-1 |
|  | FuncB ( ) | 0402 | A-2 |
|  | FuncC ( ) | 0403 | A-3 |

(a)

| KEY VALUE | MANAGING ID |
|---|---|
| HASH TABLE FOR FILE 0401(=aaaa) | A-1 |
| HASH TABLE FOR FILE 0402(=bbbb) | A-2 |
| HASH TABLE FOR FILE 0403(=bbbb) | A-3 |

| MANAGING ID | FILE | |
|---|---|---|
| A-1 | FuncA ( ) | 0401 |
| A-2 | FuncB ( ) | 0402 |
| A-3 | FuncC ( ) | 0403 |

| File | ID |
|---|---|
| HASH TABLE FOR FILE 0401 | A-1 |
| HASH TABLE FOR FILE 0402 | A-2 |
| HASH TABLE FOR FILE 0403 | A-3 |
| HASH TABLE FOR FILE 0404 | B-1 |
| HASH TABLE FOR FILE 0405 | B-2 |
| ⋮ | ⋮ |

← FOR FILE NAME "file A"
← FOR FILE NAME "file A"
← FOR FILE NAME "file A"
← FOR FILE NAME "file B"
← FOR FILE NAME "file B"

| TYPE | FILE NAME | VERSION | MANAGING ID |
|------|-----------|---------|-------------|
| 1 | A | 1.0 | 001 |
| 2 | A | 1.0 | 002 |
| 1 | A | 2.0 | 003 |
| 1 | B | 1.0 | 004 |
| ⋮ | | | |

FILE MANAGING SYSTEM

BACKGROUND OF THE INVENTION

This application claims benefit of Japanese Patent Application No. 2000-287523 filed on Sep. 21, 2000, the contents of which are incorporated by the reference.

This invention relates to file managing systems for managing files and, More particularly, to file managing system and method of keeping and managing computer program files or like files correlated in calls thereof to one another capable of keeping together files having the same title but different contents and filing different registers but having the same content to be Managed as a single file.

A usual file managing system for keeping and managing ordinary files usually manages individual files with file titles peculiar thereto. Where files are managed with sole file titles, it is impossible to keep a plurality of files of the same file title.

Accordingly, in a prior art file managing system, hierarchical directories are provided, and files of the same title are kept by entering them in respective directories.

Figure 12:
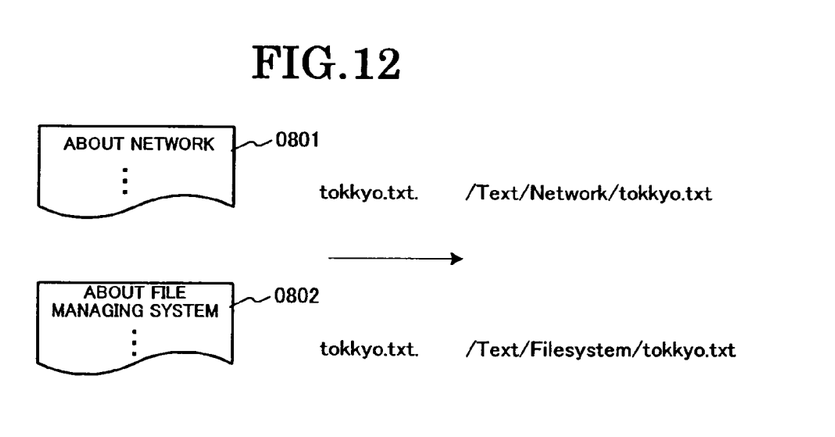
FIG. 12 shows an example, in which two files have different contents but are given the same title.
Figure 13:
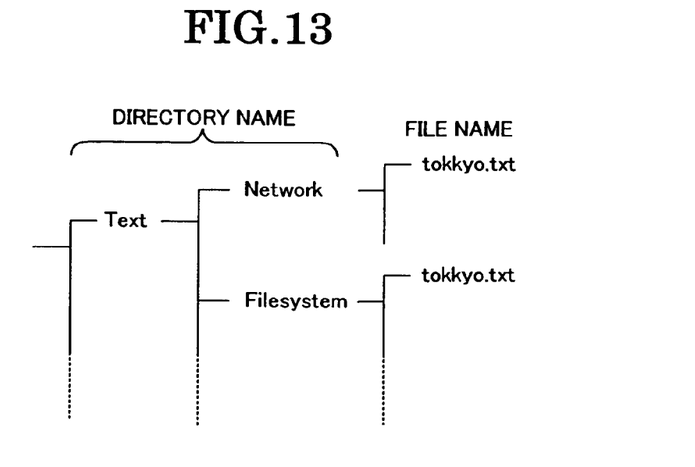
FIG. 13 shows an example of directory structure in general file system.

FIG. 12 shows an example, in which two files 0801 and 0802 have different contents but are given the same title of tokkyo.txt. Where files are managed with sole file titles, the two files can not be managed as separate files. Accordingly, as shown in FIG. 13, two different directories of /Text/Network/ and /Text File system/ are provided, and the two files are entered in these directories, respectively. In this way, the two files having the same title of tokko.txt can be managed together. Where directory names are incorporated in file titles, as in the case of FIG. 12 in which, for instance, /Text/Network/tokkyt.txt is provided as file title, a plurality of files having the title of /Text/Network/tokkyo.txt can not be provided. Thus, even a usual file system cannot keep together a plurality of files having the same title.

Japanese Patent Laid-Open No. 8-339321 proposes a technique for solving this problem. In this technique, files are managed not with file titles but with managing IDs. Also, a correspondence list, in which user names, file titles, version numbers, etc. are listed in correspondence to managing IDs, is provided. Thus, a desired file can be obtained by calling it with pertinent listed data shown to the called side. This method permits keeping a plurality of files having the same title so long as their user names, version numbers, etc. are different.

Figure 14:
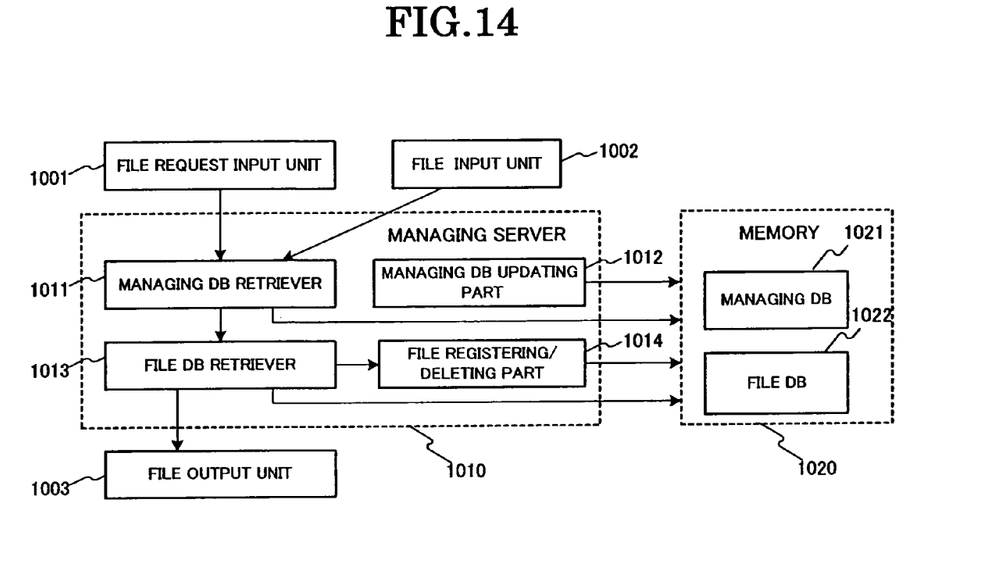
FIG. 14 shows a prior art file managing system.
Figure 15:
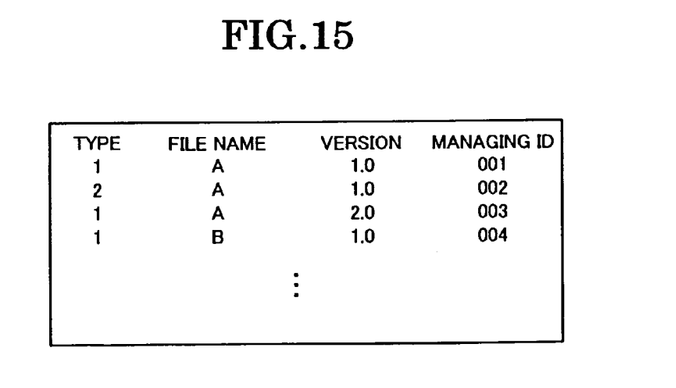

FIG. 14 shows a file managing system which implements the above prior art method. The system comprises a managing server 1010, a memory 1020, a file request input unit 1001, a file input unit 1002 and a file output unit 1003. The memory 1020 includes a file DB 1022 for storing files and a managing DB 1021 for keeping file managing data. Files have different IDs, and are stored in the file DB 1022. In the managing DB 1021, as shown in FIG. 15, correlations of the IDs to types, user names, file titles, versions, etc. are stored.

A file requester inputs these input items, i.e., type, user name, file title and version, to the file request input unit 1001. A managing DB retriever 1011 retrieves a managing DB 1021, and obtains a managing ID corresponding to the request items. A file retriever 1013 obtains a file corresponding to the obtained managing ID from the file DB 1022. The file output unit 1003 sends out the obtained file to the file requester.

When registering a file, the registering person inputs the file to be registered to the file input unit 1002. The file retriever 1013 produces a managing ID which is not utilized in any other file. The produced managing ID corresponds to the type, user name, file title and version of the file to be registered. A file registering/deleting part 1014 registers the file in the file DB 1022. A managing DB updating part 1012 registers the correspondence of the managing ID to the type, user name, file title and version of the file.

The above file managing system can be used for keeping computer program files. With computer program files collectively managed and commonly owned by a plurality of computer program executes, computer program versions and so forth can be readily managed. In addition, with files sent out to the computer program execution equipment when and only when required, resources therein can be saved.

Usually, a computer program comprises a plurality of files, and the individual files provide different functions. Among files constituting different computer programs may possibly be those, which have the same title but different contents. Where such possibility is present in the use of a usual file managing system, the individual files having the same file title can be kept together by giving a unique directory to each computer or each user. Besides, by utilizing the technique disclosed in the Japanese Patent Laid-Open No. 8-339321 same title files which are different in the user, the computer program, the version, etc. can be dealt with as different files, the system operation is obtainable without any problem even in the case of presence of the same title files.

Japanese Patent No. 2864932 shows a further prior art technique. In this technique, when a newly produced file or an edited file is to be registered, a new ID number is automatically given to it, and when a file having the same ID number is present on the called side at the time of calling a file, the call-out is controlled such as to be stopped. In this technique, files are distinguished according to file titles and ID numbers, it is a preamble that files having the same content have the same ID number.

Figure 2:
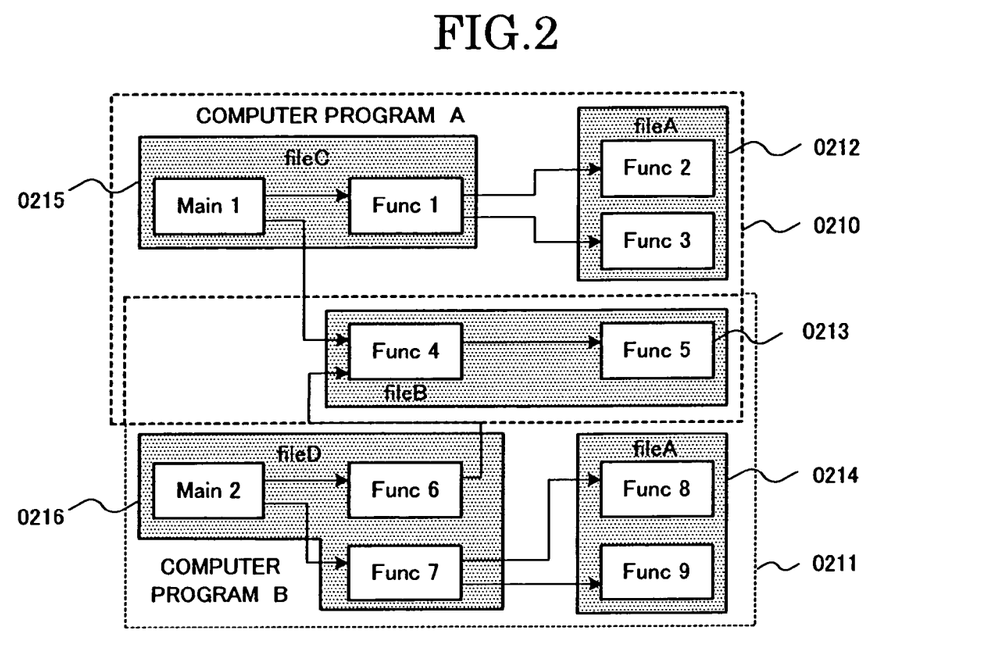
FIG. 2 is a drawing for explaining the file title overlap ping and file common use in a plurality of computer programs.

This technique thus preventing the storing or calling of a plurality of files having the same content and also distinguishing files having different contents. When a new file is produced or when a file is updated, a new ID number is given. For example, computer files may have a constitution as shown in FIG. 2. In this example, computer programs A 0210 and B 0211 have been registered by different registering persons A and B. Files A 0212 and A 0214 which have the same title but different contents, should be kept as separate files. On the other hand, a file B 0213 which is commonly used in the computer programs A 0210 and B 0211 should not be kept as separate files therein but should be kept as a single common file.

The above prior art, however, has the following problem. In a file memory which is commonly owned by a plurality of different users, it is impossible to prohibit the handling of files having the same content, if any, among files registered by a plurality of registering persons, as separate files (i.e., allow the handling of these files as a single file) while allowing the managing of files having the same file title but different contents as separate files.

In the technique disclosed in the Japanese Patent Laid-Open No. 8-339321, file titles and versions thereof are managed with unique managing IDs, and thus a file to be registered has the same file title of a file which has been registered can be registered. However, since files are each managed with each managing ID, even files having the same file title and also the same content can be managed as separate files. That is, a plurality of files having the same content may be registered as such, and they can not be dealt with as a single file, for instance a program file common to a plurality of users.

The technique disclosed in the Japanese Patent No. 2864932, in which files are managed with different ID numbers given thereto, has a problem that files with the same ID number can not be registered, or a plurality of files having the same content can not be managed as the same file if their ID numbers are different.

SUMMARY OF THE INVENTION

An object of the invention is to provide file managing system and method capable of solving the above problems and managing of files having the same title but different contents and also managing of a plurality of files registered by respective registering persons and having the same content as a single file.

According to an aspect of the present invention, there is provided a file managing system for managing files comprising a means for managing a plurality of files having the same file title but different contents as separate files and a means for managing a plurality of files having the same content as a single file.

According to another aspect of the present invention, there is provided a file managing system for managing files, comprising: a file input unit for sending out, to a data processor, inputted files to be registered, file titles to be registered and file IDs to be registered; a file request input unit for sending out, to the data processor, an inputted file title of a requested file and an inputted pertinent file ID; a memory unit including a correspondence table, in which correspondence relationships of file titles, file IDs and managing IDs are recorded, and a file memory, in which managing IDs and files are recorded; a data processor including a means for producing, if no file having the same content as any of the files to be registered has been recorded in the file memory, a new managing ID and recording the new managing ID and a file to be registered in the file memory, a means for retrieving the file memory with managing IDs for obtaining corresponding files, a means for sending out the retrieved file to a file outputting unit, a file content comparing means for comparing the content of a file to be registered and the contents of files registered in the file memory, a means for registering, if a same content file has been registered in the file memory, the file title of the pertinent file to be registered, the file ID thereof and the managing ID of the same content file in the correspondence table, and a means for retrieving the correspondence table; and the file output unit sending out, to the file request input unit, the file corresponding to the file title and the file ID requested from the file request input unit as delivered from the data processor.

According to other aspect of the present invention, there is provided a file managing system for managing files, comprising: a file input unit for sending out, to a data processor, inputted files to be registered, file titles to be registered and file IDs to be registered; a file request input unit for sending out, to the data processor, an inputted file title of a requested file and an inputted pertinent file ID; a memory unit including a correspondence table, in which correspondence relationships of file titles, file IDs and managing IDs are recorded, and a file memory, in which managing IDs and files are recorded; a data processor including a means for producing a new managing ID and registering, in the file memory, the new managing ID and a file to be registered, a file deleting means for deleting, if a same content file has been registered in the file memory, the managing ID and the file registered in the file registering means, a means for retrieving the file memory with managing IDs for obtaining corresponding files, a means for sending out the obtained files to a file output unit, a file content comparing means for comparing the content of a file to be registered with the contents of the files registered in the file memory, a correspondence table registering means for registering, in the correspondence table, the file titles to be registered, the file IDs to be registered and the new managing IDs, a correspondence table updating means for updating, if a same content file has been registered in the file memory, the contents registered in the correspondence table registering means with the file titles to be registered, the file IDs to be registered and the managing ID of the same content file, and a means for retrieving the correspondence table; and the file output unit sending out, to the file request input unit, the file corresponding to the file title and the file ID requested from the file request input unit as delivered from the data processor.

The memory unit further includes hash tables in which relationships of hash values of files and managing IDs are recorded, the data processor includes a hash table retrieving means for retrieving the hash tables with hash values of files to be registered and a hash table registering means for registering, if no same content file has been registered in the file memory, the hash values of files to be registered and corresponding managing IDs in the hash tables, and the file content comparing means compares the content of a file corresponding to a managing ID in the case of obtaining identity as a result of the retrieval in the hash table retrieving means and the content of the pertinent file to be registered.

The hash tables are each provided for each file title, and the hash table retrieving means decides, if no same title file as the file title of the any retrieved file has been registered in the file memory, that no hash table retrieval result is present, and retrieves, if a same title file has been registered in the file memory, the hash table corresponding to the file title of the same title file with the hash value of the pertinent file to be registered used as a key value.

Only a single hash table is provided for all file titles.

According to still other aspect of the present invention, there is provided a file managing method for managing files, wherein a plurality of files having the same file title but different contents are managed as separate files, while also managing a plurality of files having the same content as a single file.

According to further aspect of the present invention, there is provided a file managing method for managing files comprising the steps of: inputting, by a file registering person, files to be registered, the file titles thereof and a file ID; retrieving hash tables, in which correspondence relationships of hash values of files and managing IDs are recorded, by using the hash values of he files to be registered as key values; taking out, if a managing ID is obtained as a result of the hash table retrieval, the file corresponding to the obtained managing ID from a file memory and compares the content of the taken-out file and the contents of the files to be registered; registering, if the content of the taken-out file is the same as the content of a file to be registered, the file title to be registered, the file ID to be registered and the managing ID of the taken-out file in a correspondence table; and producing, if no identity is obtained as a result of the hash table retrieval or if no same content file is detected although identity is obtained as a result of the hash table retrieval, a new managing ID, registering the new managing ID thus produced and the corresponding file to be registered in the file memory, registering the new managing ID in the hash table with the hash value of the file to be registered used as a key value, and registering the file title to be registered, the file ID to be registered and the new managing ID in the correspondence table.

According to still further aspect of the present invention, there is provided a file managing method for managing files comprising the steps of: inputting, by a file registering person, files to be registered, file titles thereof and a file ID; producing new managing IDs corresponding to the files to be registered and registering the produced managing IDs and the files to be registered in a file memory; registering file titles to be registered, a file ID to be registered and the new managing IDs in a correspondence table; retrieving hash tables, in which correspondence relationships of hash values of files and managing IDs are recorded, by using the hash values of the files to be registered as key values; retrieving, when a managing ID is obtained as a result of the hash table retrieval, the file memory to take out the file corresponding to the obtained managing ID and comparing the content of the taken-out file and the contents of the files to be registered; updating, if the content of the taken-out file is the same as a file to be registered, the new managing IC registered in the correspondence table to the managing ID corresponding to the taken-out file, and deleting the new managing ID registered in the file memory and the files to be registered from the file memory; and registering, if no identity is obtained as a result of the hash table retrieval or if no same content file is detected although identify is obtained as a result of the hash table retrieval, the new managing ID in the hash table with the hash values of the files to be registered as key values.

The hash tables are each provided for each file title, in the hash table retrieval each hash table is retrieved for any file having the same file title as a file to be registered, decides, if no same title file has been recorded, that no retrieval result is present, and retrieves, if a same content file has been recorded, the hash table corresponding to the file title of the same title file with the hash value of the file to be registered used as a key value.

The hash table is provided for all of file titles.

According to other aspect of the present invention, there is provided a file managing method for managing files comprising the steps of: inputting, by a file requester, the file title of a desired file and the corresponding file ID; retrieving a correspondence table, in which file titles, file IDs and managing IDs are recorded, with the inputted file title and file ID; obtaining, form the correspondence table, the file title corresponding to the inputted file title and file ID and a managing ID corresponding to the inputted file ID; retrieving a file memory, in which managing IDs and files are recorded, with the obtained managing ID; obtaining, for the file memory, a file corresponding to the obtained managing ID; and sending out the obtained file as the desired file to the file requester.

Other objects and features will be clarified from the following description with reference to attached drawings.

PREFERRED EMBODIMENTS OF THE INVENTION

Preferred embodiments of the present invention will now be described with reference to the drawings.

Figure 1:
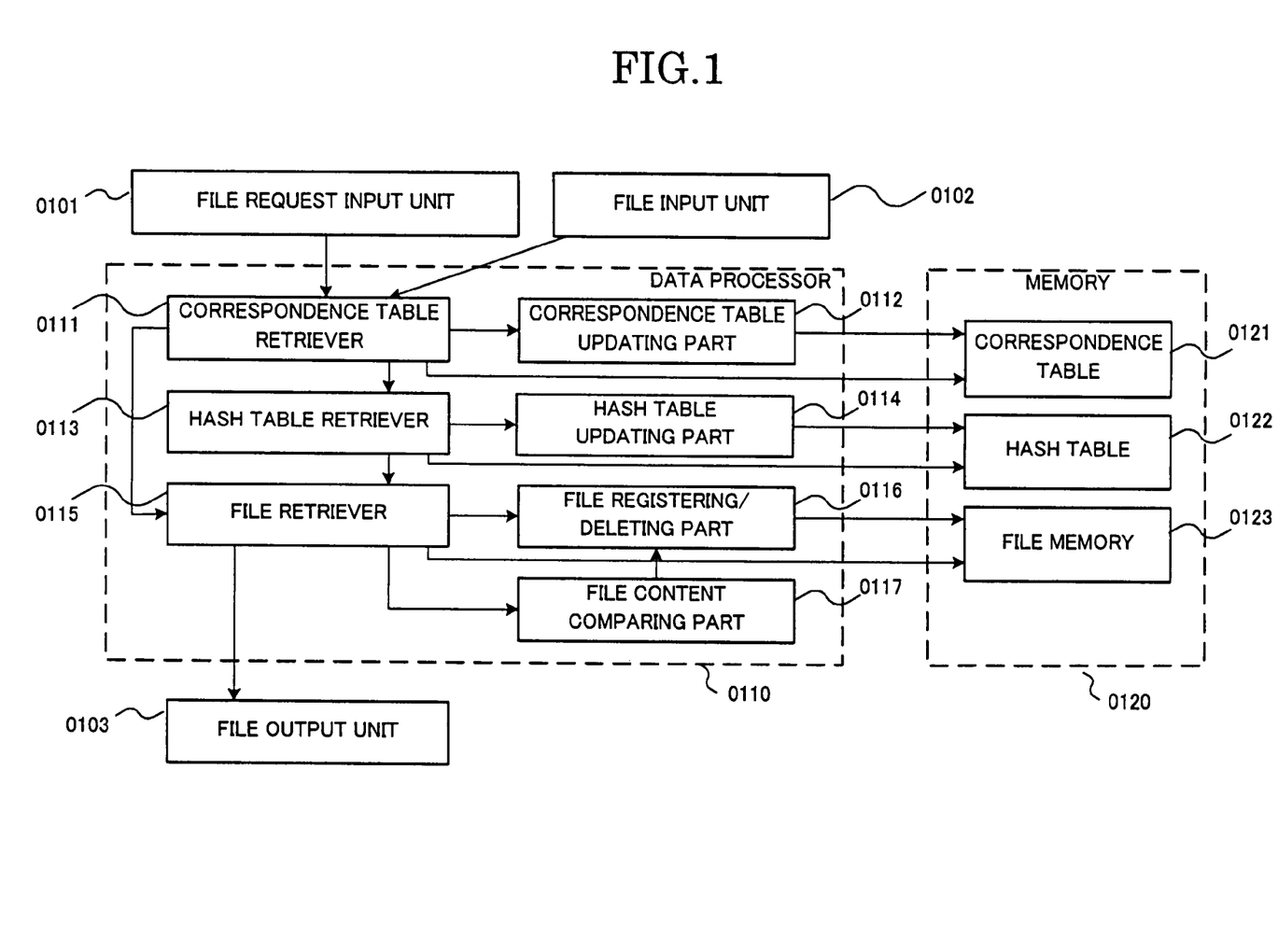
FIG. 1 shows a first embodiment of the file managing system according to the present invention

FIG. 1 shows a first embodiment of the file managing system according to the invention. The illustrated system comprises two different input units, i.e., a file request input unit 0101 and a file input unit 0102, a data processor 0110 for processing the inputs to the two input units, a memory 0120 for keeping a list of files and data thereof, and a file output unit 0103 for sending out files in response to file requests.

Generally, the file request input unit 0101, the file input unit 0102, the file output unit 0103 and the data processor 0110 each have a communicating function, are inter-connected via a network. File registering persons and file requesters cause the input and output of data to and from the file managing system according to the invention via the network.

The file request input unit 0101 is used by file requesters. A file requester can input the file title of a desired file and a file ID given to him or her via the file request input unit 0101 to the data processor 0110. To the file input unit 0102, a file register inputs a file to be registered together with the corresponding file title and file ID. The inputted file, file title and file ID are sent out to the data processor 0110. The file output unit 0103 outputs a file complying with the file request to the file requester.

The data processor 0110 includes a correspondence table retriever 0111 and a correspondence table updating part 0112 which correspond to a correspondence table 0121, a hash table retriever 0113 and a hash table updating part 0114 which correspond to a hash table 0122, a file retriever 0115 and a file registering/deleting part 0116 which correspond to a file memory 0123, and a file content comparing part 0117. The correspondence table 0121, the hash table 0122 and the file memory 0123 together constitute a memory unit 0120.

Figure 3:
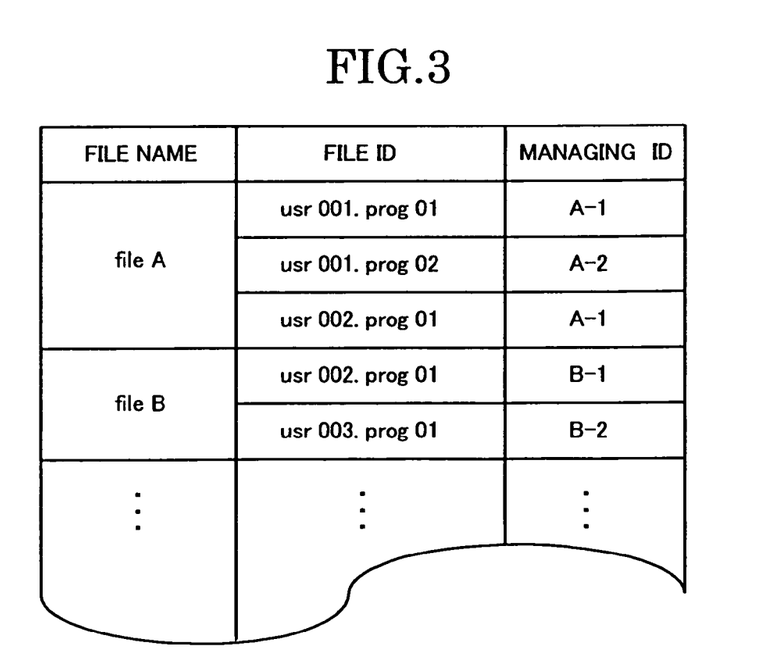
FIG. 3 shows an example of correspondence table.

In the correspondence table 0121, file titles, file IDs and managing IDs corresponding to files are recorded. In an example shown in FIG. 3, three files having a file title of "file A" are registered. These files are registered with file IDs of "usr001.prog01", "usr001.prog02" and "usr002.prog01", respectively, and correspond to managing IDs of "A-1", "A-2" and "A-1", respectively. The file with the file ID of "usr001.prog01" and the file with the file ID of "usr001.prog02" correspond to different managing IDs, and are thus recognized to be files which have the same file title but different contents. The file with the file ID of "usr001.prog01" and the file with the file ID of "usr002.prog01" correspond to the same managing ID, and are thus regarded and handled as a single file because their contents are the same.

The correspondence table retriever 0111 provides a function of retrieving the correspondence table 0121 with file titles and file IDs to obtain corresponding managing IDs. It is also possible to cause retrieval of the table by designating the sole file title. The correspondence table updating part 0112 provides a function of registering the correspondence relationship of new file title, file ID and managing ID in the correspondence table 0121 or updating a registered correspondence relationship.

The hash table 0122 is provided for each file title. A numerical value having a certain length (i.e., hash value) is calculated from a byte array of a file itself (i.e., file substance).

This value (i.e., hash value) is referred to as key value, and is recorded in a table, in which the managing ID of the pertinent file is recorded.

Figure 4:
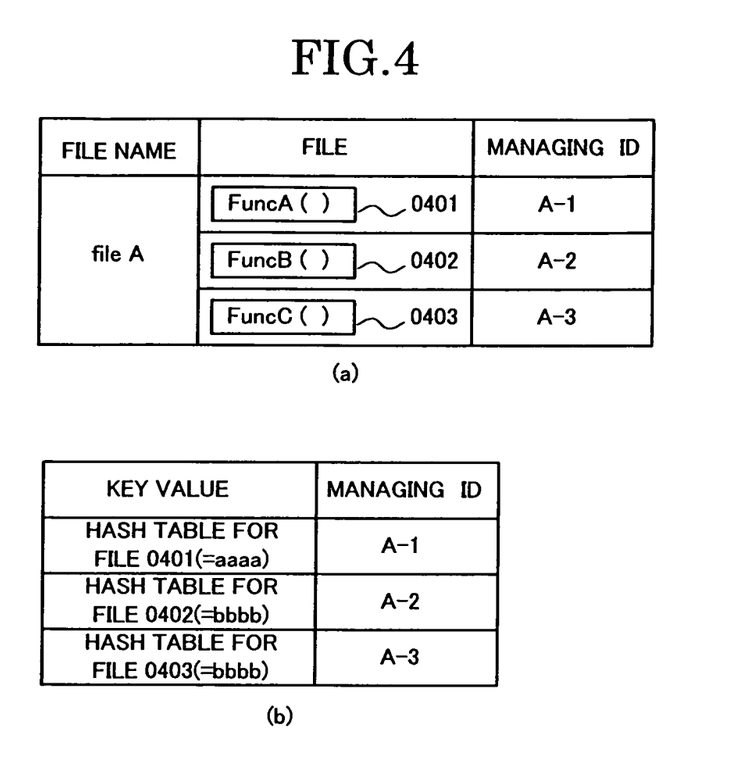
FIGS. 4(a) and 4(b) show an example of hash table.

FIGS. 4(a) and 4(b) show an example of hash table. Referring to FIG. 4(a), three files 0401, 0402 and 0403 are registered as files having a file title of "file A". These files 0401, 0402 and 0403 have different contents of Func A, Func B and Func C, respectively. Because of their different contents, these files have different managing IDs. FIG. 4(b) shows a hash table 0122 with the file title of "file A" which is produced from the above files. In this example, the key values in the hash table 0122 obtained form the files 0402 and 0403 are the same. In this case, the hash table retriever 0113 obtains two managing IDs of "A-2" and "A-3" by retrieving the hash table 0122 with either of the hash values of the files 0402 and 0403. It will be seen that a managing ID obtained by retrieving the hash table 0122 may not be the same as that of a file used for the retrieval. However, the key values (or hash values) calculated from files having the same content are always the same. That is, where files having the same content are among registered files, files having the same content are always resent among files having managing IDs obtained as a result of retrieval of the hash table 0122. In other words, by retrieving the hash table 0122 with the hash value of a file, it is possible to obtain a file or files having the same content as the used file. Using the hash table 0122 makes it unnecessary to compare the file content with all the files having the same file title, thus greatly reducing the time necessary for the file content comparison.

The hash table retriever 0113 provides a function of retrieving the hash table 0122 by using a hash value obtained from a file as a key value to obtain a managing ID corresponding to the key value. The hash table updating part 0114, when given a file and the corresponding managing ID, calculates the key value (or hash value) in the hash table corresponding to the given file, and registers the correspondence relationship between the key value and the given managing ID in the hash table 0122. The hash table updating unit 0114 also has a function of deleting a given managing ID from the hash table. The file memory 0123 provides a function of stopping the file itself (i.e., file substance) by using the corresponding managing ID.

Figure 8:
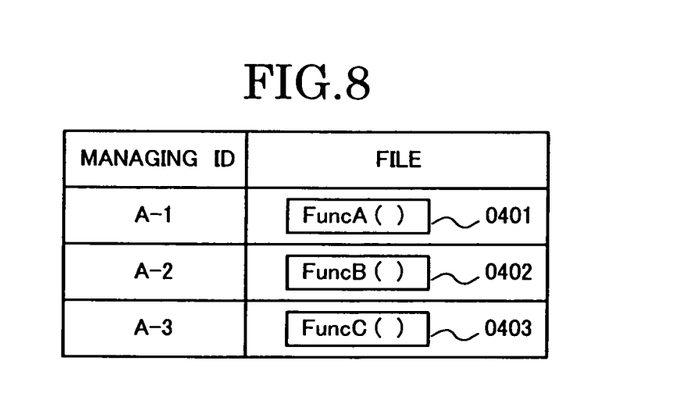
FIG. 8 shows an example of the file memory 0123.

The file retriever 0115 provides a function of retrieving the file memory 0123 for a file corresponding to a given managing ID. The file retriever 0115 also provides a function of producing as new managing ID for a file to be registered. The file retriever 0115 further has a function of sending out a retrieved file to the file output unit 0103. The file registering/deleting part 0116 provides a function, when given a file and the corresponding managing ID, of registering the given file in the file memory 0123 with the given managing ID or deleting a registered file from the file memory 0122 with the given managing ID. FIG. 8 shows an example of the file memory 0123. The file content comparing part 0117 compares the content of a file to be registered and the content of the files registered in the file memory 0123.

This embodiment of the file managing system manages files with managing IDs and file IDs. The managing ID is an ID (identifier) for identifying a file preserved in the file memory 0123. Although a managing ID given to each file is not specified here, a peculiar managing ID is given as, for instance, "file title+serial number" to each file preserved in the file memory 0123. The file ID is a value for identifying a file registering person or a file requester. Files having different file IDs can be handled as separate files even if they have the same file title so long as they have different contents. The file IDs of different registering persons should be different.

Also, when registering files constituting a plurality of different computer programs, some of such computer programs may have files which have the same file title but different contents. Such same title files can be handled as separate files by giving different file IDs to them. This means that it is necessary that a registering person can own a plurality of file IDs. The file ID is not specified here, but it conceivably has a form of, for instance, "register @ computer program". This form of the file ID has a meaning that its part concerning the registering person is predetermined to have an absolute sense among registering persons while each registering person can freely handle its part concerning the computer program. Also, it is possible to use different file IDs among users and among computer programs by utilizing as means for automatically allotting new file IDs which are not in use.

The operation of the first embodiment of the invention will now be described with reference to the drawings.

Figure 5:
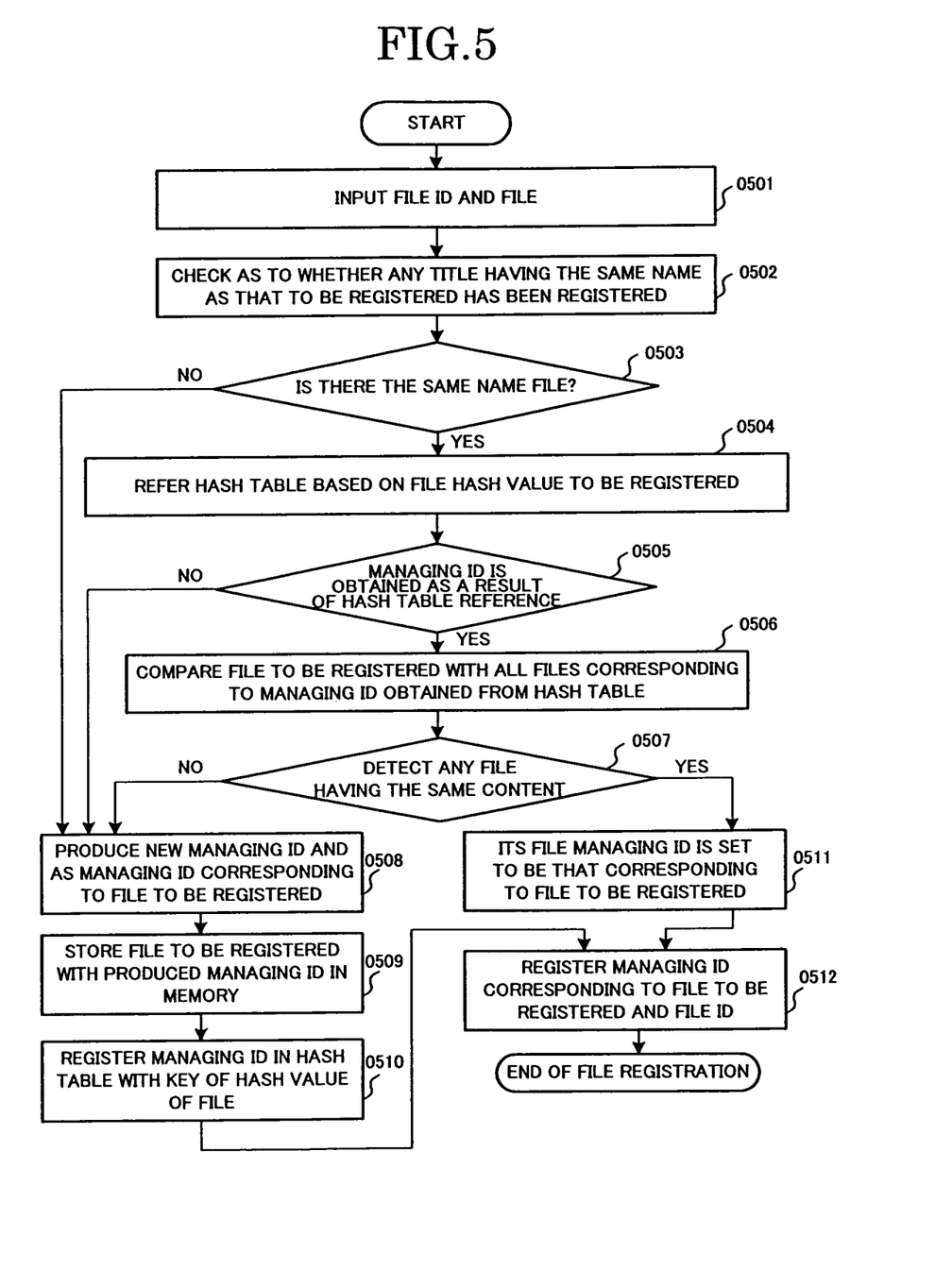
FIG. 5 is a flow chart illustrating the operation when registering a new file.

First, the operation in the case of registering a new file will be descried with reference to FIGS. 1 and 5. FIG. 5 is a flowchart illustrating the operation when registering a new file. Referring to FIG. 5, a file registering person inputs a file and a file ID which is used when calling out that file to the file input unit 0102 (step 0501).

The correspondence table retriever 0111 then retrieves the correspondence table 0121 for any file having the same file title as the file to be newly registered (step 0502). Thus, a check can be done as to whether any file having the same file title has been registered. If a same title file has been registered (step 0503), a check is done as to whether the registered file and the file to be newly registered are the same or different in the content.

Specifically, the hash table retriever 0113 retrieves the hash table 0122 corresponding to the file title of the file to be newly registered by using the hash value of the file (step 0504). If an identical key value fails to be obtained as a result of the retrieval, it means that no registered file having the same file title and the same content as the file to be newly registered is present.

If the identical key value is obtained as a result of the retrieval (step 0505), it is possible that a file having the same content as the file to be newly registered is present as file having the managing ID corresponding to that key value. Thus, file content comparison is then done. Specifically, the file retriever 0115 retrieves the file memory 0123 to take out a file or files having the managing ID corresponding to the identical key value detected in the step 0504. The file content comparing part 0117 compares the contents of all the taken-out files with the content of the file to be newly registered (step 0506).

If any file having the same content is detected (step 0507), such file and the file to be newly registered are handled as a single file. That is, the file to be newly registered is not registered in the memory unit 0120, but the file corresponding to the given file ID is made to be the file obtained in the step 0506 (i.e., registered file having the same content as the file to be newly registered). Also, the managing ID corresponding to the given file ID is made to be the managing ID of the registered same content file step 0511).

If no same title file is detected in the step 0503, if no identical key value is obtained in the step 0505 or if no same content file is detected in the step 0507, the file to be newly registered should be registered as such in the file memory 0123. To this end, the file retriever 0115 first retrieves the file memory 0123 to obtain a new managing ID not used in any other file. The new managing ID is made to be the managing ID of the file to be newly registered and correspond to the given file ID (step 0508).

The file registering/deleting part 0116 registers the file to be newly registered in the file memory 0123 with the new managing ID (step 0509). The hash table updating part 0114 registers the new managing ID in the hash table 0122 with the hash value of the newly registered file as a key value (step 0510). After the step 0511 or the step 0510, the correspondence table updating part 0112 registers the correspondence relationship of the registered file ID and the managing ID related thereto in the step 0511 or the step 0508 in the correspondence table 0121 (step 012).

Figure 6:
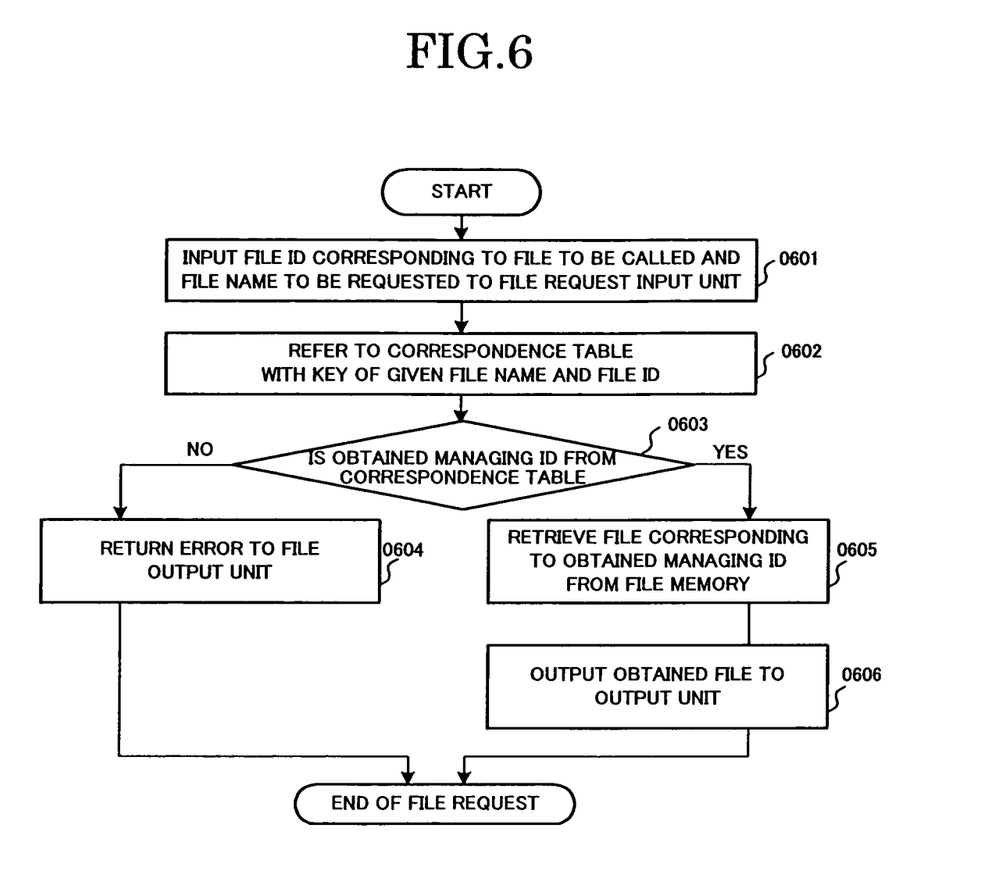
FIG. 6 is a flow chart illustrating the operation when requesting a file.

Now, the operation in the case of requesting a file will be described with reference to FIGS. 1 and 6. FIG. 6 is a flow chart illustrating the operation when requesting a file.

Referring to FIG. 6, a file requester inputs the file title of the request file and the file ID allotted to him or her to the file request input unit 0101 (step 0601). The correspondence table retriever 0111 retrieves the correspondence table 0121 for the inputted file title and the managing ID corresponding to the inputted file ID (step 0602). If the corresponding managing ID fails to be obtained, an error indicating that no corresponding file has been registered is outputted in lieu of any file to the file output unit 0103 (step 0604). If the corresponding managing ID is obtained, the file retriever 0115 takes out a file corresponding to the obtained managing ID from the file memory 013 (step 0605). The obtained file is outputted as a file having the inputted file title to the file output unit 0103 (step 0606). The file output unit 0103 sends out the file to the file requester.

As an example of form of use, a file requester is given only a single file ID. A file registering person registers all the files as utilized by the single file requester with the same file ID. For example, when registering computer program files, all the files constituting a computer program are registered with a single file ID. Thus, a person who executes this computer program, i.e., the file requester requesting the files of this computer program can obtain all the files of the computer program by showing the single file ID every time he or she requests a file.

The operation of the data processor 0110 and the memory unit 0120 in the first embodiment will now be described in greater details in connection with a specific example.

Figure 9:
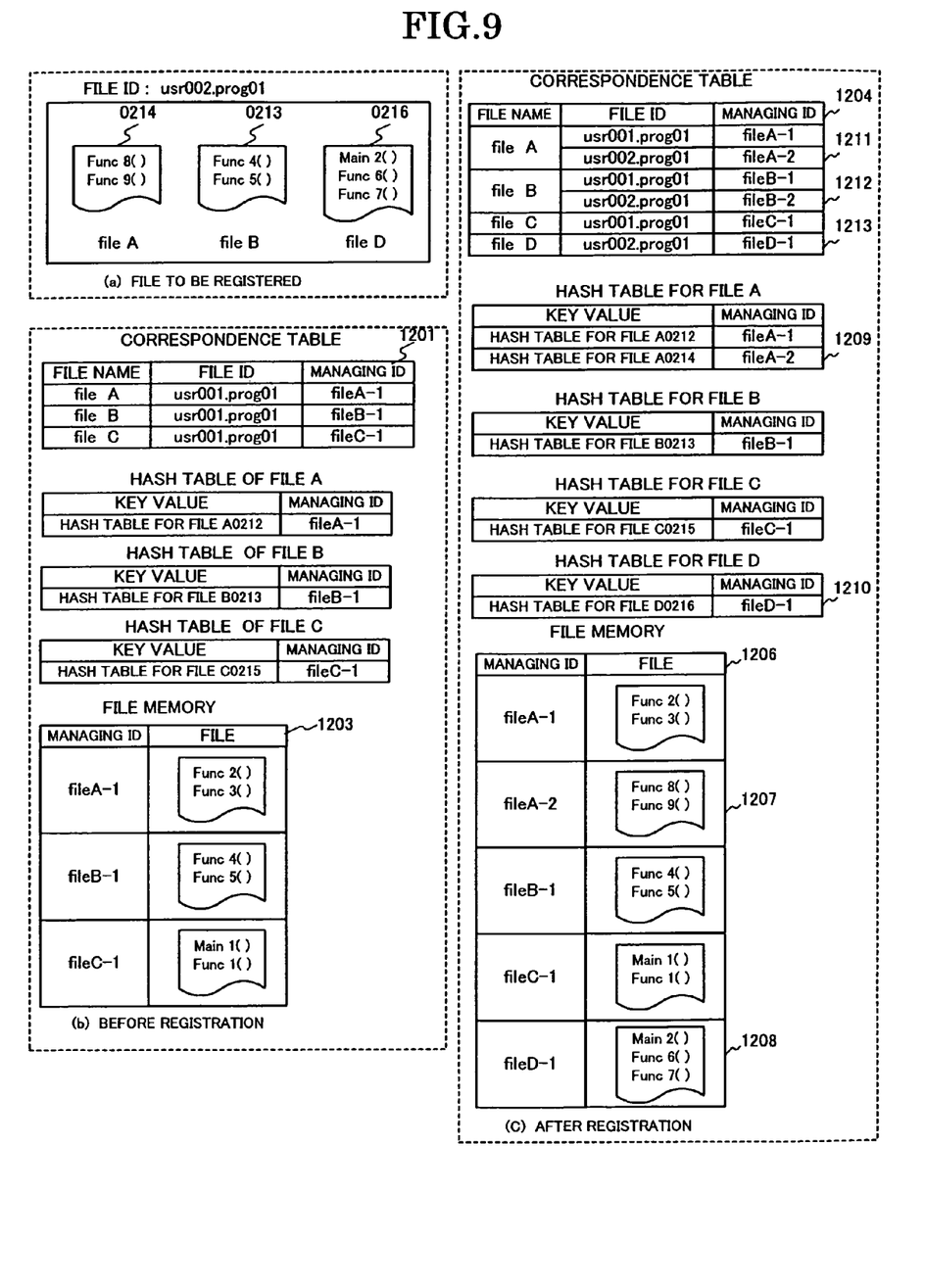
FIGS. 9(a) to 9(c) are views for describing the example when registering files.

The operation when registering files will first be described with reference to FIGS. 5 and 9(*a*) to 9(*c*). FIGS. 9(*a*) to 9(*c*) are views for describing the example when registering files.

In this example, it is assumed that the files A 0212, B 0213 and C 0215 constituting the computer program A 0210 shown in FIG. 2 have already been stored with a file ID of "usr001.prog01". FIG. 9(*b*) shows the correspondence table, the hash table and the file memory at this time. It is intended to register, in this state, the files A 0214, B 0213 and D 0219 constituting the computer program shown in FIG. 2 with a file ID of "usr002.prog01" (see FIG. 9(*a*)).

In the first place, the files A 0314, B 0213 and D 0216 as files to be registered are inputted together with the file ID "usr002.prog01" in the file input unit 0102 (step 0501). The correspondence table retriever 0111 checks whether any file of the same file title as any one of the files A 0214, B 0213 and D 0216 has been registered (step 0502). As for the file D 0216, no same title file is present. A check is thus made as to whether any file having the same content as any one of the registered files A 0214 and B 0213 having the same file title is present.

The hash table retriever 0113 retrieves the hash table with the hash values of the files A 0214 and B 0213 used as key values (step 0504). As for the file A 0214 no same content file is detected, but as for the file B 0213 a file having a managing ID of "file B-1" is detected (step 0505). By merely detecting a file with the hash table, it cannot be distinguished whether the detected file really has the same content or the key value of the hash table as calculated from the detected file is only accidentally identical. Accordingly, the file retriever 0115 takes out the file having the managing ID of "file B-1" from the file memory 0123. The file content comparing part 0117 compares the contents of the taken-out file and the file B 0213 to be registered (step 0506).

Here, the two compared files have the same content. Thus, the file having the file title of "file B" and the file ID of "usr002.prog01" is given a managing ID of "file B-1" (step 0511). As for the files A 0214 and D 0216 without any registered same content file, new files should be registered.

First, the file retriever 0115 produces new managing IDs not used in any other file. Here, managing IDs of "file A-2" and "filer D-1" are allotted to the files A 0214 and D 0218, respectively. The file registering/deleting part 0116 then registers A 0214 and D 0216 in the file memory 0123 with the managing IDs of "file A-1" and "file D-1", respectively (step 0509). As a result, two new rows 1207 and 1208 are additionally provided in the file memory 0123. The hash table updating part 0114 then registers the correspondence relationship of the files A 0214 and D 0216 and the managing IDs of "file A-2" and "file D-1" to one another in the hash tables (step 0510). Thus, new rows 1209 and 1210 are additionally provided to the hash tables.

Finally, the correspondence table updating part 0112 registers the correspondence relationship of the managing IDs given to the files A 0214, B 0213 and D 0216 and the file IDs of "usr002.prog011" given at the time of the registration to one another in the correspondence table 0121 (step 0512). As a result, new rows 1211, 1212 and 1213 are additionally provided to the correspondence table. The correspondence table, the hash tables and the state of the file memory when the registration has been ended are as shown in FIG. 9(*c*).

Now, the operation when requesting a file will be described with reference to FIGS. 6 and 9.

When requesting a file, the pertinent file title and file ID are inputted to the file request input unit 0101 (step 0601). Taking the result shown in FIG. 9(*c*) for example, by requesting a file with the file title of "file A" and the file ID of "usr001.prog01", the correspondence table retriever 0111 retrieves the correspondence table 1204 (step 06032), and returns the corresponding managing ID of "file A-1". The file retriever 0115 retrieves the file memory 1206 to obtain the managing ID of "file A-1" (step 0605), and the file output unit 0103 outputs the obtained file A 0212 (step 0606).

A second embodiment of the invention will now be described. It is estimated that the process of comparing file contents takes relatively long time. Accordingly, a system is desired, in which a file can be sent out as soon as its request received even during registration by checking for files having the same contents as those of newly registered files.

The second embodiment is different from the first embodiment in that a file can be sent out as soon as its request is received even during registration by checking for files having the same contents as those of newly registered files.

Figure 7:
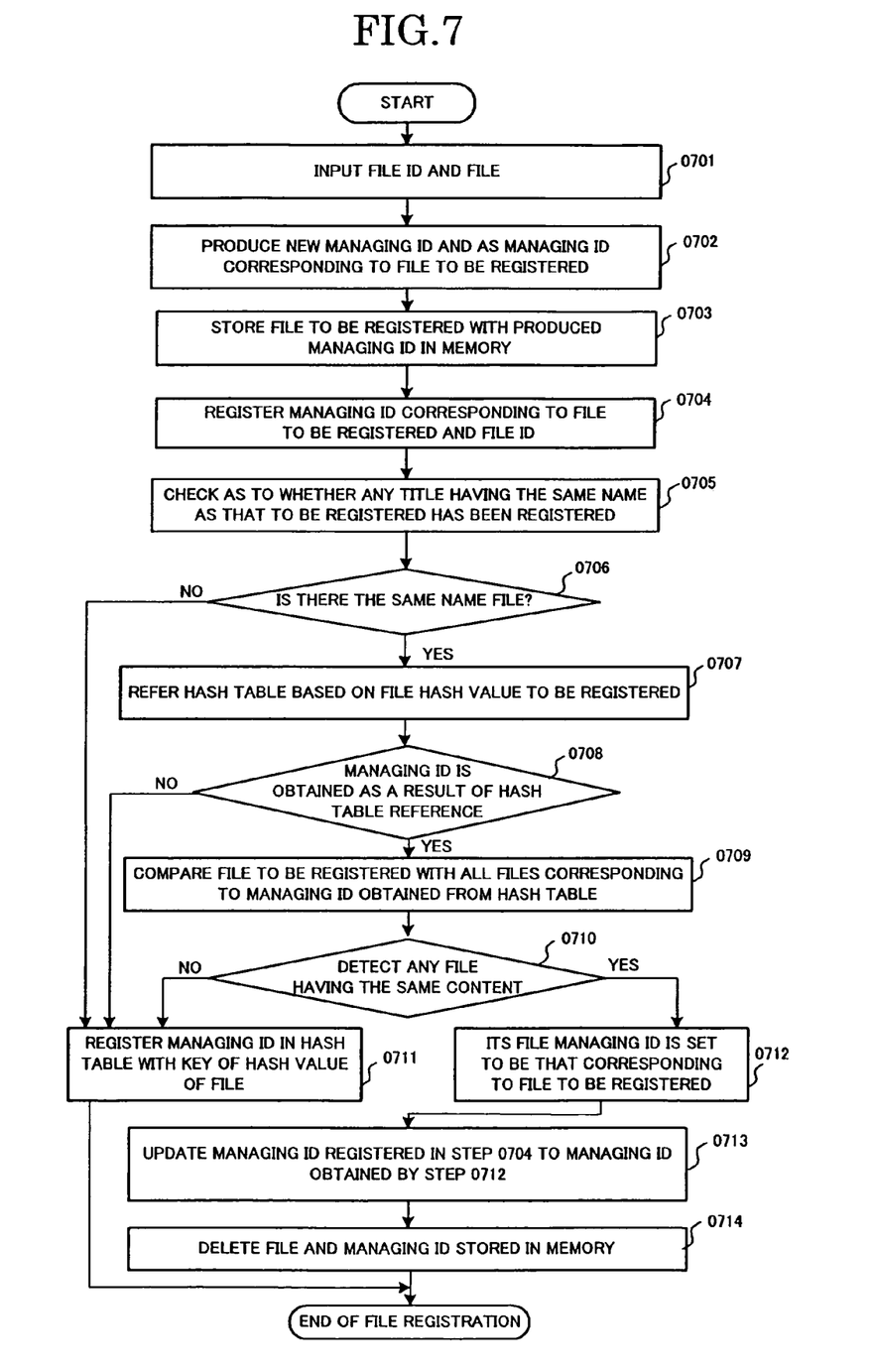
FIG. 7 is a flow chart illustrating the operation of the second embodiment when registering a new file.

The operation of the second embodiment will now be described in connection with the case of registering a new file with reference to FIGS. 1 and 7. FIG. 7 is a flow chart illustrating the operation of the second embodiment when registering a new file.

Referring to FIG. 7, a step 0701 is the same as the step 0501 shown in FIG. 5. The file retriever 0115 retrieves the file memory 0123 to obtain a new managing ID not used for any other file. The new managing ID is made to be the managing ID of the file to be registered and also the managing ID corresponding to the file ID to be registered (step 0702). The file registering/deleting part 0116 registers the file to be registered in the file memory 0123 with the managing ID (step 0703).

The correspondence table updating part 0112 registers the correspondence relationship between the file ID to be registered and the managing ID (step 0704). That is, the same operation as in the steps 0508, 0509 and 0512 shown in FIG. 5 is executed. At this time, a file requested for registration can be sent out. Subsequently, a check is made as to whether any file having the same content as the file to be registered is present. If any such file is present, common operation is executed. Specifically, the operation of steps 0705 through 0710 is the same as the steps 0502 through 0507 shown in FIG. 5. However, if no same title file is detected in the step 0706, if no file can be obtained as a result of the reference to the hash tables in the step 0708 or if no same content file is detected in the step 0710, the same operation as in the step 0510 shown in FIG. 5 is executed, and the managing ID obtained in the step 0702 is registered in the hash table with the hash value of the file used as a key value, thus completing the registration of the file (step 0711).

When a same content file is detected in the step 0710, the same operation as in the steps 0511 through 0512 shown in FIG. 5 is executed. The managing ID corresponding to the given file ID is made to be the managing ID of the same content file already registered (step 0712), and the managing ID registered in the step 0704 is updated to the managing ID of the same content file already registered (step 0713). Subsequently, the file registering/deleting part 0116 deletes the files registered in the file memory 0123 together with the managing IDs of these files (step 0714).

A specific example of the second embodiment will now be described in details with reference to FIGS. 7 and 10(*a*) to 10(*c*). It is assumed that the memory unit 0120 before the registration is in the state shown in FIG. 9(*b*), and the example shown in FIG. 9(*a*) used in the description of the specific example of the first embodiment are used as files to be newly registered.

Figure 10:
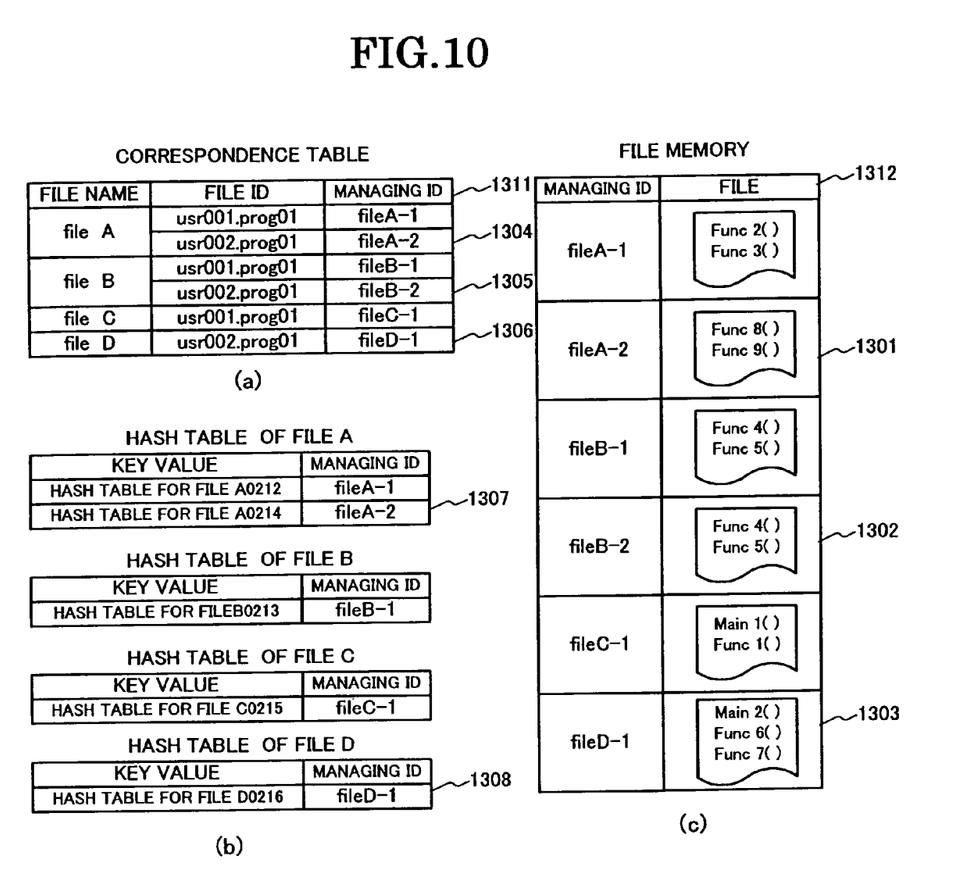
FIGS. 10(a) to 10(c) are views for describing a specific example of the operation when registering files.

FIGS. 10(*a*) to 10(*c*) are views for describing a specific example of the operation when registering files. When the files are inputted, new managing IDs are obtained, and then the inputted files are registered. Here, managing IDs of "file A-2", "file B-2", and "file D-1" are given for the files A 0214, B 0213 and D 0216, respectively (step 0702).

The file registering/deleting part 0116 registers the files in the file memory 0123 with the managing IDs thus obtained (step 703). As a result, new rows 1301, 1302 and 1303 are additionally provided to the file memory (see FIG. 10(*c*)). Then, the correspondence table updating part 0112 registers the combination of the correspondence relationship of the file titles of "file A", "file B" and "file D" and the file ID of "usr002.prog01", and the managing IDs of "file A-2", "file B-2" and "file D-1" in the correspondence table 0121 (step 0704). As a result, new rows 1304, 1305 and 1306 are additionally provided to the correspondence table (see FIG. 10(*a*)). Thereafter, the same operation as in the case of the first embodiment is executed. In this case, however, concerning the file D 0216 without any same title file and the file A 0214 without any same content file among the registered files, it is unnecessary to update the correspondence table and the contents registered in the file memory in the steps 0702 through 0704. Thus, the hash table updating part 0114 registers the correspondence relationship of the hash value of the file A 0214 and the managing ID of "file A-2" and also the correspondence relationship of the hash value of the file D 0216 and the managing ID of "file D-1" in hash tables, respectively (step 0711). As a result, new rows 1307 and 1308 are additionally provided to the hash tables (see FIG. 10(*b*)).

As for the file B 0213, which is found in the step 0710 such that a same content file B (with the managing ID of "file B-1") has been registered, the managing ID of the registered same content file is made to be the managing ID corresponding to the given file ID (step 0712), and the managing ID of "file B-2" corresponding to the file ID of "usr002.prog01" is updated to "file B-1" with the file title of "file B" registered in the correspondence table in the step 0704 (step 0713). Subsequently, the file registering/deleting part 0116 deletes the file B with the managing ID of "file B-2" registered in the file memory 0123 in the step 0703 (step 0714).

The final result obtained is thus the same as the correspondence table, the hash tables and the file memory state shown in FIG. 9(*c*) as the result of the specific example described before in connection with the first embodiment.

A third embodiment of the invention will now be described. In the previous first and second embodiments, it is assumed that same content files also have the same file title. However, files which do not have any same file title but have the same content may be present. These files also can desirably be handled as a single file. The third embodiment is different from the first and second embodiments in that files which do not have any same file title but have the same content can be handled as a single file.

Figure 11:
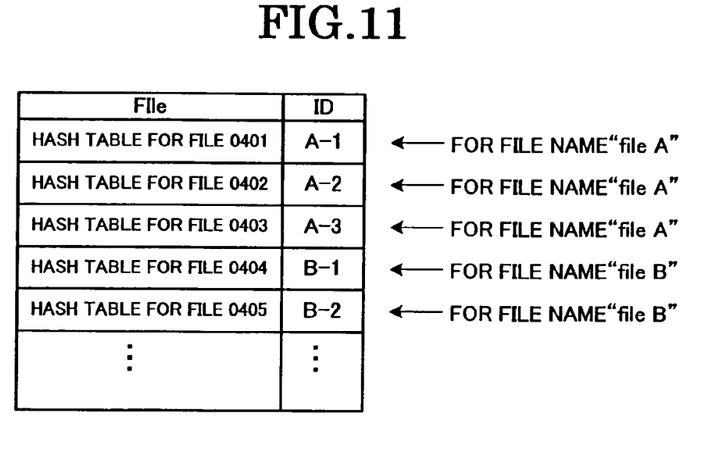
FIG. 11 shows an example of hash table.

The third embodiment has the same construction as shown in FIG. 1. However, for permitting files having different file titles to be handled as a single file so long as the content is the same, the hash tables 0122 are not each provided for each file title, but a single hash table is provided for all the file titles (see FIG. 11).

As for the registration of files, this embodiment is different from the examples concerning FIGS. 5 and 7. In the cases of FIGS. 5 and 7, a same title file check is done after inputting file ID and files. In this embodiment, no file title is used for the same content file check. Thus, the same title file check in the steps 0502 through 0503 shown in FIG. 5 is not done, but after inputting file ID and files in the step 0501 the same content file check in the step 0501 is done, that is, the hash table is retrieved for hash values of files which are identical with key value. The operation subsequent to the step 0504 is the same as in the case of FIG. 5. In connection with FIG. 7, the same title file check in the steps 0705 through 0706 is not done. Instead, after recording the correspondence relationship of the managing IDs, the file titles and the file ID in the step 0704, the same content file check in the step 0707 is done, that is, the hash table retrieval with the hash value of the files as key values is done. The operation subsequent to the step 0707 is the same as in FIG. 7. The operation of requesting a file is the same as in FIG. 6.

As has been described in the foregoing, the present invention has advantages that, in a file managing system which is common to pluralities of file registering persons and file requesters, files having the same file title can be readily and efficiently managed. Thus, a file registering person does not need to avoid using the same file title as that of other registering persons, and also the file managing system can avoid waste of resources. This is so because of the provision of the means, which can manage files having the same file title as separate files so long as the files have different contents, and also the means, which can handle files having the same content as a single file even if the files have been registered by different persons and commonly uses resources in the file memory.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A file managing system for managing a file, comprising:
   (a) a file input unit configured to receive a file to be registered, a file title to be registered, and a file ID to be registered;
   (b) a file request input unit configured to receive a requested file title and a requested file ID of a requested file;
   (c) a file memory unit including:
      a correspondence table that stores a correspondence relation-among the file title, the file ID, and a managing ID; and
      a hash table that stores a relationship between a hash value of the file and the managing ID which uniquely identifies the file;
   (d) a computer data processor programmed to include:
      (1) a correspondence table search unit configured to receive the requested file title and the requested file ID from the file request input unit, search the correspondence table, to determine the presence or absence of the managing ID, corresponding to the requested file title or the requested file ID;
      (2) a file search unit configured to search for a file stored in the file memory unit based on the managing ID obtained by the correspondence table search unit;
      (3) a file content comparison unit configured to receive the file to be registered from the file input unit, compare a content of the file to be registered with a content of the file stored in the file memory unit, to determine a presence or absence of a similar content, and when there is the similar content file stored in the file memory unit, outputting the similar content file's managing ID;
      (4) a correspondence table change unit configured to store the file title to be registered, the file ID to be registered, and the managing ID of the similar content file output by the file content comparison unit in the correspondence table when it is determined by the file content comparison unit that the similar content file exists, and when it is determined by the file content comparison unit that the similar content file is not stored in the file memory unit, storing the file title to be registered, the file ID to be registered, and a new managing ID generated by the file search unit in the correspondence table;
      (5) a file registration and delete unit configured to, when the similar content file does not exist, store the new managing ID and the file to be registered in the file memory unit;
      (6) a file output unit that receives the requested file corresponding to the requested file title and the requested file ID from the computer data processor, and sends the requested file to the file request input unit; and
      (7) a hash table search unit configured to search the hash table with the hash value of the file to be registered, and a hash table change unit configured to store, the hash value of the file to be registered and the new managing ID into the hash table when the similar content file does not exist;
   wherein the file content comparison unit is further configured to compare a content of the file corresponding to the managing ID matched by the hash table search unit with the content of the file to be registered.

2. The file managing system according to claim 1, wherein
   the hash table is provided for each file title;
   the correspondence table search unit is further configured to search the correspondence table to determine existence of a file having a same file title as the file to be registered; and
   when the file having the same file title is stored in the correspondence table, the hash table search unit searches the hash table corresponding to the file title using the hash value of the file to be registered as a key.

3. The file managing system according to claim 2, wherein only a single hash table is provided for all file titles.

4. A file managing system for managing a file, comprising:
   (a) a file input unit configured to receive a file to be registered, a file title to be registered, and a file ID to be registered;
   (b) a file request input unit configured to receive a requested file title and a requested file ID of a requested file;
   (c) a file memory unit including a hash table that stores a hash value for the file along with a relationship between the hash value, the file title, the file ID, and a managing ID for uniquely specifying the file;
   (d) a computer data processor programmed to include:
      (1) a correspondence table search unit configured to receive the requested file title and the requested file ID from the file request input unit, search the correspondence table to determine the presence or absence of the managing ID corresponding to the requested file title or the requested file ID;
      (2) a file search unit configured to search for a file stored in the file memory unit based on the managing ID obtained by the correspondence table search unit;
      (3) a file content comparison unit configured to receive the file to be registered from the file input unit, compare a content of the file to be registered with a content of the file stored in the file memory unit to determine a presence or absence of a similar content file, and when there is the similar content file stored in the file memory unit, outputting the similar content file's managing ID;
      (5) a correspondence table change unit configured to store the file title to be registered, the file ID to be registered, and a new managing ID generated by the file search unit into the correspondence table, and after that, when the file content comparison unit determines that the similar content file exists, deleting the file title, the file ID, and the new managing ID of the file to be registered from the correspondence table and storing the file title, the file ID, and the managing ID of the similar content file output by the file content comparison unit into the correspondence table; and
      (6) a file registration and delete unit configured to, when the file, the file title, and the file ID are input to the file input unit, store the new managing ID created by the file search unit and the file to be registered into the file memory unit, and when the file content comparison unit determines that the similar content file exists, delete the new managing ID and the file corresponding to the new managing ID; and
      (7) a file output unit that receives the requested file corresponding to the requested file title and the requested file ID from the computer data processor, and sends the requested file to the file request input unit; and (8) a hash table search unit configured to search the hash table with the hash value of the file to be registered, and a hash table change unit configured to store, the hash value of the file to be registered and the new managing ID into the hash table when the similar content file does not exist; and wherein the file content comparison unit is further configured to compare a content of the file corresponding to the managing ID matched by the hash table search unit with the content of the file to be registered.

5. A file managing method for managing a file in a file managing system comprising a file input unit, a computer data processor, and a memory unit comprising a correspondence table, a hash table, and a file memory unit, the method comprising:

receiving a file to be registered, a file title, and a file ID;

searching, with a hash table search unit of the data processor, the hash table for a correspondence relation between a hash value of the file and a managing ID for uniquely specifying the file using a hash value of the file to be registered as a key;

when the managing ID is obtained as a result of the search of the hash table, a file content comparison unit of the computer data processor searches for a file corresponding to the managing ID in the file memory unit, retrieves the file, and compares a content of the retrieved file with a content of the file to be registered;

when a content of the retrieved file is equivalent to a content of the file to be registered, a correspondence table change unit of the computer data processor registers the file title to be registered, the file ID to be registered, and the managing ID of the retrieved file into the correspondence table, and when the hash table search unit searches the hash table and no match is found or when there is no file having an equivalent content, a file search unit of the computer data processor generates a new managing ID, a file registration delete unit of the computer data processor registers the new managing ID and the file to be registered into the file memory unit; a hash table change unit of the computer data processor registers the new managing ID into the hash table using the hash value of the file to be registered as the key; and the correspondence table change unit registers the file title to be registered, the file ID to be registered, and the new managing ID into the correspondence table.

6. The file managing method according to claim 5, wherein the hash table is provided for each file title, the correspondence table search unit of the computer data processor searches the correspondence table to determine whether or not there is a same file title as the file title of the file to be registered, when the same file title is not registered in the correspondence table, the hash table search unit determines that there is no search result, whereas when the same file title is registered in the correspondence table, the hash table search unit searches the hash table corresponding to the file title using a hash value of the file to be registered as the key.

7. The file managing method according to claim 5, wherein only a single hash table is provided for all file titles.

8. A file managing method for managing a file in a file managing system comprising a file input unit, a computer data processor, and a memory unit comprising a correspondence table, a hash table, and a file memory unit, the method comprising:

receiving a file to be registered, a file title, and a file ID;

generating, by a file search unit of the computer data processor, a new managing ID that is different from any already-registered file managing ID;

registering, by a file registration delete unit of the computer data processor, the new managing ID and the file to be registered into the file memory unit;

registering, by a correspondence table change unit of the computer data processor, the file title and the file ID of the file to be registered, and the new managing ID into the correspondence table;

searching, by a hash table search unit of the computer data processor, the hash table for a correspondence relation between a hash value of a registered file and a registered managing ID that uniquely specifies the registered file using a hash value of the file to be registered as a key, when the managing ID is obtained as a result of the search of the hash table, a file content comparison unit of the computer data processor searches for a file corresponding to the managing ID in the file memory unit, retrieves the file, and compares a content of the retrieved file with a content of the file to be registered, when a content of the retrieved file is equivalent to a content of the file to be registered, the correspondence table change unit changes the new managing ID registered in the correspondence table to a managing ID of the retrieved file; and the file registration delete unit deletes the new managing ID and the file to be registered from the file memory unit, when the hash table search unit searches the hash table and no match is found or when there is no file having an equivalent content, a hash table change unit of the computer data processor registers the new managing ID into the hash table using the hash value of the file to be registered as the key.

* * * * *